Aug. 5, 1924.                               1,503,900
                    B. JOHNSON
           FUEL HEATER FOR INTAKE MANIFOLDS
             Filed Jan. 7, 1922        2 Sheets-Sheet 2

Inventor
*B.Johnson.*
By *C.A.Snow & Co.*
Attorney

Patented Aug. 5, 1924.

1,503,900

UNITED STATES PATENT OFFICE.

BILLIE JOHNSON, OF TEMPLE, TEXAS.

FUEL HEATER FOR INTAKE MANIFOLDS.

Application filed January 7, 1922. Serial No. 527,737.

*To all whom it may concern:*

Be it known that I, BILLIE JOHNSON, a citizen of the United States, residing at Temple, in the county of Bell and State of Texas, have invented a new and useful Fuel Heater for Intake Manifolds, of which the following is a specification.

This invention relates to means for heating fuel while passing from a carburetor to the explosion chambers of an engine, one of the objects of the invention being to provide an electric heater for heating the fuel initially, there being additional means for conducting the exhaust gases along a tortuous path for the purpose of heating the fuel after the engine has started and without requiring the use of the electric heater.

Another object is to provide a structure of this character which is simple, durable and compact.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
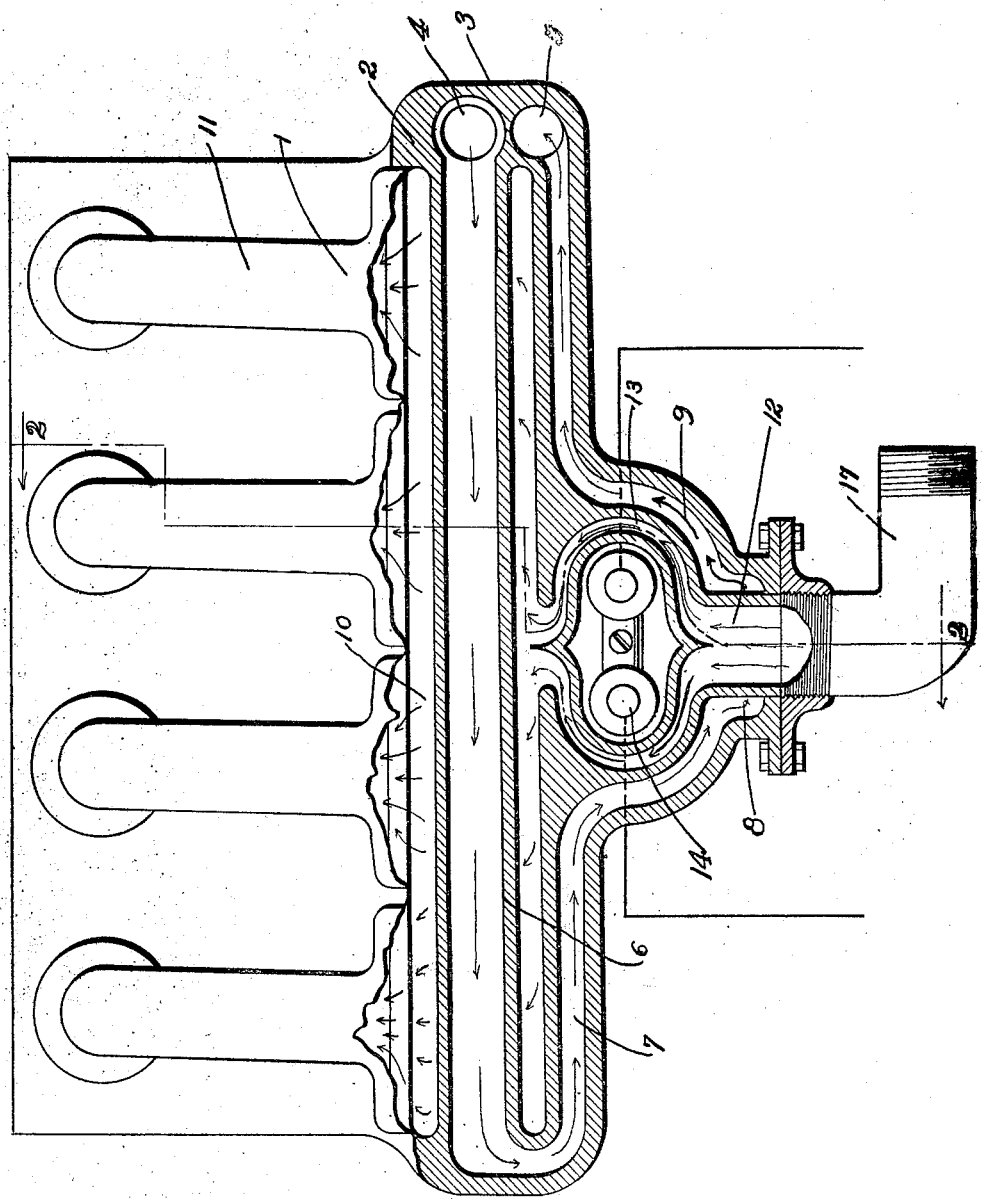
Figure 1 is a view partly in section and partly in elevation of a manifold having the present improvements combined therewith.
Figure 2:
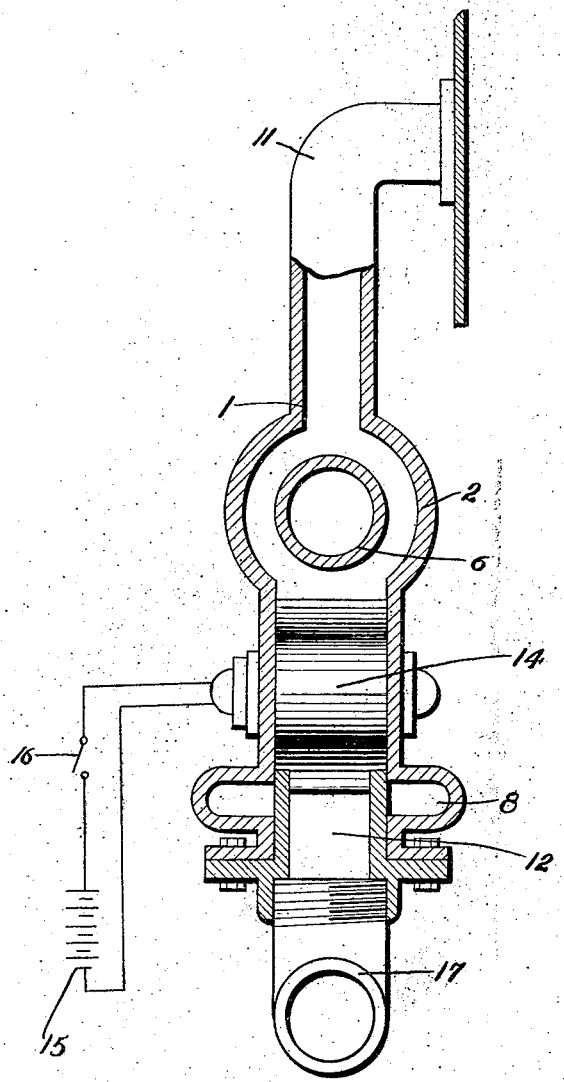
Figure 2 is a section on line 2—2, Figure 1.

Referring to the figures by characters of reference 1 designates the intake manifold of an internal combustion engine, the same including a block 2 provided with a head 3 having an exhaust intake port 4 and an exhaust outlet port 5. Extending longitudinally within the block 2 is a central flue 6 communicating at one end with the exhaust intake 4 and at its other end with an outlet passage 7 which extends under the block 2 and downwardly to a hollow ring 8 from which another passage 9 extends upwardly and along the block 2 to the outlet port 5. The flue 6 is spaced from the wall of the block 2 so as to form a space 10 therearound for fuel to be heated, the pipes 11 of the manifold being in communication with this space as shown.

Arranged under the block at the center thereof is a fuel intake flue 12 having an enlarged portion 13 between the downwardly and upwardly curved portions of the passages or flues 7 and 9. In this enlarged portion of the flue 12 is arranged an electric heater indicated generally at 14 and which is electrically connected to a storage battery 15 or other source of electrical energy, there being a switch 16 included in the circuit whereby the current can be cut off from the heater whenever desired. A pipe 17 extends to the flue 12 from a carburetor not shown.

In using the device herein described the switch 16 is shifted so as to energize the heater 14. Thus when fuel is sucked from the carburetor it will flow through the pipe 17 to the flue 12 and around the heater 14 which will raise the temperature of the fuel. This heated fuel will then circulate around the flue 6 and pass through the pipes 11 into the respective combustion chambers. After the engine has started and the spent gases begin to exhaust therefrom, the heater 14 can be deenergized by throwing the switch 16. The hot exhaust gases will pass from the engine through port 4 into the flue 6 thence downwardly through the passage 7 to the ring 8, flowing around the flue 12 and upwardly through passage 9 to the outlet port 5. Obviously, therefore, these exhaust gases will quickly raise the temperature of the surfaces contacted thereby with the result that, as the fuel flows from the pipe 17 through the passage 12 and thence around the flue 6, it will be raised to a high temperature.

It will be obvious that by utilizing apparatus such as described, low grades of fuel can be used for operating the internal combustion engine.

What is claimed is:

1. In an intake manifold the combination with a block having a longitudinal flue therein, and a fuel conducting passage extending around the flue and within the block, of a feed passage opening into said space around the flue and having an enlarged portion, an electric heater within the enlarged portion, a passage extending from one end of the longitudinal flue and along the block and around the fuel passage to the other end of the block, and ports for conducting exhaust gases into one end of the longitudinal flue and from one end of the passage along the block.

2. The combination with an intake manifold including a block, a longitudinal flue within the block and having a fuel passage extending therearound from one end to the other of the flue, and an exhaust port opening into one end of the flue, of a fuel feeding passage opening into the space around the longitudinal flue, said passage having an enlargement, an electric heater within the enlargement, means for energizing the heater at will, a passage extending around said fuel feeding passage and opening at one end into one end of the longitudinal flue and at its other end into an outlet port.

3. The combination with an intake manifold including a block having a longitudinal flue therein, an exhaust port opening into one end of the flue, an exhaust conducting passage extending from the other end of the flue, a fuel feeding passage opening into the block, there being a space extending around the longitudinal flue for the reception of the fuel, an electric heater within the fuel feeding passage, means for energizing the heater at will, and an exhaust outlet port in communication with the exhaust conducting passage, said passage being extended along the block and around the fuel feeding passage.

4. The combination with an intake manifold, of a fuel passage opening thereinto, an electric heater within said passage, and means for energizing the heater at will, there being a passage for conducting exhaust gases across the path of the fuel within the manifold thence along the outer portion of the manifold and around the fuel feed passage.

5. The combination with the intake manifold of an explosive engine, including a block having outlet pipes extending therefrom, of a longitudinal exhaust conducting flue within the block and spaced from the walls thereof to form a fuel passage therearound opening into the pipes, a fuel supply passage opening into said fuel passage and having an enlarged portion, an electric heater within the enlarged portion, an exhaust conducting passage extending from one end of the flue and opening from the block at a point adjacent the other end of the flue, said passage extending around the fuel feeding passage, and an exhaust port opening into the longitudinal flue.

In testimony that I claim the foregoing as my own, I have hereto affixed my signature in the presence of two witnesses.

BILLIE JOHNSON.

Witnesses:
PAUL CASMUR,
MINNIE J. THOMPSON.